(12) United States Patent
Carter

(10) Patent No.: US 11,794,665 B2
(45) Date of Patent: Oct. 24, 2023

(54) VEHICLE CAMERA COVER

(71) Applicant: Beverly Carter, Denver, CO (US)

(72) Inventor: Beverly Carter, Denver, CO (US)

(*) Notice: Subject to any disclaimer, the term of this patent is extended or adjusted under 35 U.S.C. 154(b) by 19 days.

(21) Appl. No.: 17/399,183

(22) Filed: Aug. 11, 2021

(65) Prior Publication Data
US 2023/0017706 A1 Jan. 19, 2023

Related U.S. Application Data

(60) Provisional application No. 63/223,097, filed on Jul. 19, 2021.

(51) Int. Cl.
| | | |
|---|---|---|
| *B60R 11/04* | (2006.01) | |
| *B60S 1/08* | (2006.01) | |
| *H04N 23/51* | (2023.01) | |
| *H04N 23/57* | (2023.01) | |
| *B60R 11/00* | (2006.01) | |

(52) U.S. Cl.
CPC ............ *B60R 11/04* (2013.01); *B60S 1/0844* (2013.01); *H04N 23/51* (2023.01); *H04N 23/57* (2023.01); *B60R 2011/0094* (2013.01)

(58) Field of Classification Search
CPC ............ B60R 11/04; B60R 2011/0094; B60S 1/0844; H04N 5/2252; H04N 5/2257
USPC .......................................................... 348/148
See application file for complete search history.

(56) References Cited

U.S. PATENT DOCUMENTS

| | | | | |
|---|---|---|---|---|
| 3,819,856 | A  * | 6/1974 | Pearl ................ | G08B 13/19632 |
| | | | | 396/419 |
| 6,614,481 | B1 * | 9/2003 | Sasaki .................. | G03B 11/045 |
| | | | | 348/E5.025 |
| 10,627,700 | B1 * | 4/2020 | Harris .................... | G01J 1/0266 |
| 2005/0028831 | A1 * | 2/2005 | Sloan ..................... | B60N 3/083 |
| | | | | 131/231 |
| 2005/0117900 | A1 * | 6/2005 | Ohmori ................ | G03B 11/041 |
| | | | | 396/448 |
| 2014/0023357 | A1 * | 1/2014 | Wong ..................... | G03B 17/12 |
| | | | | 396/419 |
| 2014/0049615 | A1 * | 2/2014 | Uwagawa .......... | G02B 27/0006 |
| | | | | 359/511 |
| 2014/0295918 | A1 * | 10/2014 | Grifoni ................... | G06F 1/163 |
| | | | | 455/566 |
| 2018/0295316 | A1 * | 10/2018 | Callis, Jr. ............... | B64D 47/08 |
| 2019/0086773 | A1 * | 3/2019 | Okamura ............... | G03B 17/08 |
| 2020/0391676 | A1 * | 12/2020 | Wu .......................... | B60R 13/04 |

* cited by examiner

*Primary Examiner* — Matthew David Kim
(74) *Attorney, Agent, or Firm* — Brennan, Manna & Diamond, LLC

(57) ABSTRACT

The present invention relates generally to the field of camera covers. More specifically, the present invention relates to a vehicle camera cover for exterior cameras of a vehicle. The cover is comprised of a base that is further comprised of a padded magnet or adhesive layer that allows the cover to magnetically or adhesively attach to the exterior surface of a vehicle. A magnetic base layer with a magnetic bottom surface further attaches to the top surface of the magnet layer, and is comprised of a hinge. A transparent lid further attaches to the hinge, wherein the outer surface of the hinge is comprised of a water-repelling coating. Therefore, the cover ensures precipitation or debris cannot obstruct, cover, or damage the exterior cameras of a vehicle, and wherein the cover can be removed as desired without damaging the exterior vehicle surface.

4 Claims, 6 Drawing Sheets

VEHICLE CAMERA COVER

CROSS-REFERENCE TO RELATED APPLICATION

The present application claims priority to, and the benefit of, U.S. Provisional Application No. 63/223,097, which was filed on Jul. 19, 2021 and is incorporated herein by reference in its entirety.

FIELD OF THE INVENTION

The present invention relates generally to the field of camera covers. More specifically, the present invention relates to a vehicle camera cover for exterior cameras of a vehicle. The cover is comprised of a base that is further comprised of a padded magnet layer that allows the cover to magnetically attach to the exterior surface of a vehicle. A magnetic base layer with a magnetic bottom surface further attaches to the top surface of the magnet layer, and is comprised of a hinge. Alternatively, an adhesive, such as a pressure sensitive adhesive, may be used in place of the magnets. A transparent lid further attaches to the hinge, wherein the outer surface of the hinge is comprised of a water-repelling coating. Therefore, the cover ensures precipitation or debris cannot obstruct, cover or damage the exterior cameras of a vehicle, and wherein the cover can be removed as desired without damaging the exterior vehicle surface. Accordingly, the present disclosure makes specific reference thereto. Nonetheless, it is to be appreciated that aspects of the present invention are also equally applicable to other like applications, devices and methods of manufacture.

BACKGROUND OF THE INVENTION

As vehicles continue to become more technologically advanced, many vehicle models are equipped with exterior cameras. Said exterior cameras record and allow a user to view the surrounding area of a vehicle (ex. road areas, other vehicles, etc.). In any given vehicle, examples of such camera may include: exterior backup cameras, front-facing cameras, side-facing cameras, exterior mirror-mounted blind spot cameras, etc.

Although said cameras function properly in ideal weather, the same cannot be said when weather conditions become suboptimal. For example, precipitation in the form of rain, snow, sleet, etc. may collect on the exterior surface of an exterior vehicle camera and partially or completely obstruct the view of the camera. Further, airborne debris may strike or collect on the exterior surface of an exterior vehicle camera, and may damage the camera or also obstruct its field of view. Obstruction of exterior cameras may be extremely dangerous to a driver, who then may not be able to see the surrounding area of their vehicle, which in turn significantly impacts the ability to drive safely. Further, damage to exterior cameras can result in hundreds, if not thousands, of dollars in repair fees for the vehicle owner.

Therefore, there exists a long-felt need in the art for a device that protects the exterior camera of a vehicle. Further, there exists a long-felt need in the art for a vehicle camera cover that protects an exterior vehicle camera from being obstructed by precipitation. In addition, there exists a long-felt need in the art for a vehicle camera cover that protects an exterior vehicle camera from being obstructed or damaged by airborne debris that strike the camera. Finally, there exists a long-felt need in the art for a vehicle camera cover that protects an exterior vehicle camera from precipitation or debris obstruction/damage, wherein the cover can be removably attached to a vehicle exterior without damaging the exterior surface of the vehicle.

The subject matter disclosed and claimed herein, in one embodiment thereof, comprises a vehicle camera cover. The cover is comprised of a base that further contains a magnet layer that removably attaches to a vehicle exterior surface and a magnetic base layer that attaches to the top surface of the magnet layer. In differing embodiments, both the magnet layer and magnetic base layer can encompass the entire area, or only a portion of the vehicle exterior area, around each exterior camera on a vehicle. The base layer may further be comprised of a convex cover or convex hood that covers/shields an exterior vehicle camera from precipitation/debris obstruction and damage.

In this manner, the vehicle camera cover of the present invention accomplishes all of the forgoing objectives and provides a means to adequately protect the exterior cameras of a vehicle from being obstructed or damaged by precipitation or debris. Further, the cover is removable and does not require permanent attachment to a vehicle exterior. As a result, the cover also does not damage the exterior of a vehicle when applied to the surface.

SUMMARY

The following presents a simplified summary in order to provide a basic understanding of some aspects of the disclosed innovation. This summary is not an extensive overview, and it is not intended to identify key/critical elements or to delineate the scope thereof. Its sole purpose is to present some general concepts in a simplified form as a prelude to the more detailed description that is presented later.

The subject matter disclosed and claimed herein, in one embodiment thereof, comprises a vehicle camera cover that can be applied to the exterior surface of a vehicle. The cover is comprised of a magnet layer, a magnetic base layer and a transparent lid, wherein the magnet layer allows the cover to be magnetically-connected to the exterior surface of a vehicle. To prevent the magnet layer from damaging the exterior surface, the layer may be comprised of a thin padding that protects the vehicle exterior, yet still allows the magnet layer to magnetically attach to the exterior surface. A magnetic base layer further attaches to the magnet layer via a magnetic bottom surface. Further, one embodiment of the cover may include a magnetic base layer and magnet layer that further attach to one another via a tongue and groove assembly.

In one embodiment of the cover, a transparent, impact-resistant lid attaches to the magnetic base layer via a hinge. The lid is further comprised of a concave outer surface that is comprised of a water-repelling coating that prevents precipitation from covering the lid and obstructing the view of the camera the cover is protecting. The lid may also be comprised of a pull tab to allow the user to lift the lid to clean, remove or replace the lid, and also clean the vehicle camera as needed.

In addition, one embodiment of the cover may also be comprised of an upper hood and lower hood in lieu of a lid. Like other embodiments of the cover, this particular embodiment is also comprised of a magnet layer and thin padding that allows the cover to be magnetically connected to the exterior surface of a vehicle, and wherein a magnetic base layer further attaches to the magnet layer via a magnetic bottom surface. Further, this embodiment may also include a magnetic base layer and magnet layer that further attach to one another via a tongue and groove assembly. Accordingly, the concave upper hood and convex lower hood can be placed above and below the camera in order to shield the camera from precipitation or debris damage.

Therefore, the vehicle camera cover of the present invention is particularly advantageous as it allows a user to protect the exterior cameras of his or her vehicle from being obstructed by precipitation or damaged by debris. Further, the cover is non-permanent and thus does not damage the exterior surface of the vehicle. As a result, the cover is extremely desirable as it provides a non-permanent camera protection solution that can be removed from and applied to any vehicle an individual owns without damaging said vehicle.

To the accomplishment of the foregoing and related ends, certain illustrative aspects of the disclosed innovation are described herein in connection with the following description and the annexed drawings. These aspects are indicative, however, of but a few of the various ways in which the principles disclosed herein can be employed and are intended to include all such aspects and their equivalents. Other advantages and novel features will become apparent from the following detailed description when considered in conjunction with the drawings.

BRIEF DESCRIPTION OF THE DRAWINGS

The description refers to provided drawings in which similar reference characters refer to similar parts throughout the different views, and in which.

DETAILED DESCRIPTION

Figure 1A:
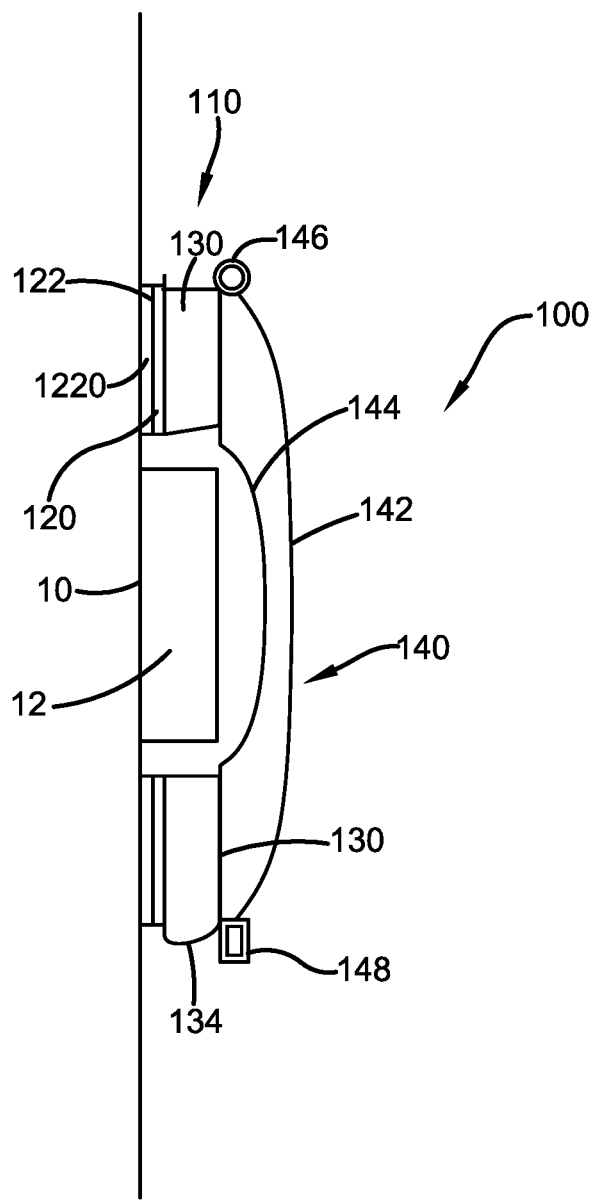
FIG. 1A illustrates a side perspective view of one potential embodiment of a vehicle camera cover device of the present invention that is further comprised of a lid and is attached to the exterior surface of a vehicle (shown as prior art) in accordance with the disclosed architecture.

The innovation is now described with reference to the drawings, wherein like reference numerals are used to refer to like elements throughout. In the following description, for purposes of explanation, numerous specific details are set forth in order to provide a thorough understanding thereof. It may be evident, however, that the innovation can be practiced without these specific details. In other instances, well-known structures and devices are shown in block diagram form in order to facilitate a description thereof. Various embodiments are discussed hereinafter. It should be noted that the figures are described only to facilitate the description of the embodiments. They are not intended as an exhaustive description of the invention and do not limit the scope of the invention. Additionally, an illustrated embodiment need not have all the aspects or advantages shown. Thus, in other embodiments, any of the features described herein from different embodiments may be combined.

As noted above, there is a long-felt need in the art for a device that protects the exterior cameras of a vehicle. Further, there exists a long-felt need in the art for a vehicle camera cover that protects an exterior vehicle camera from being obstructed by precipitation and from being obstructed or damaged by airborne debris. Finally, there exists a long-felt need in the art for a vehicle camera cover that protects an exterior vehicle camera from precipitation or debris obstruction/damage, wherein the cover can be removably attached to a vehicle exterior without damaging the exterior surface of the vehicle.

The present invention, in one exemplary embodiment, is comprised of a vehicle camera cover that can be applied to the exterior surface of a vehicle. The cover is comprised of a magnet layer, a magnetic base layer, and a transparent lid, wherein the magnet layer allows the cover to be magnetically-connected to the exterior surface of a vehicle. The layer may also be comprised of a thin padding that prevents the layer from damaging the exterior surface of a vehicle, and therefore protects the vehicle exterior while still allowing the magnet layer to magnetically attached to the exterior surface. The magnetic base layer further attaches to the magnet layer via a magnetic bottom surface, wherein said attachment may include a magnetic base layer and magnet layer that attach to one another via a tongue and groove assembly in one embodiment.

In another embodiment of the cover, a transparent, impact-resistant lid attaches to the magnetic base layer via a hinge. The lid is further comprised of a concave outer surface that is comprised of a water-repelling coating that prevents precipitation from covering the lid and obstructing the view of the camera the cover is protecting. The lid may also be comprised of a pull tab to allow the user to lift the lid to clean, remove or replace it and also clean the vehicle camera as needed.

In addition, one embodiment of the cover may also be comprised of an upper hood and lower hood in lieu of a lid. Like other embodiments of the cover, this particular embodiment is also comprised of a magnet layer and thin padding that allows the cover to be magnetically-connected to the exterior surface of a vehicle, and a magnetic base layer that further attaches to the magnet layer via a magnetic bottom surface. Further, this embodiment may also include a magnetic base layer and magnet layer that further attach to one another via a tongue and groove assembly. Accordingly, the concave upper hood and convex lower hood can be placed above and below the camera in order to shield the camera from precipitation or debris damage.

Therefore, the vehicle camera cover of the present invention is particularly advantageous as it allows a user to protect the exterior cameras of his or her vehicle from being obstructed by precipitation or damaged by debris. Further, the cover is non-permanent and thus does not damage the exterior surface of the vehicle. As a result, the cover is extremely desirable as it provides a non-permanent camera solution that can be removed from and applied to any vehicle an individual owns without causing damage to the exterior surface.

Referring initially to the drawings, FIG. 1A illustrates a side perspective view of one potential embodiment of a vehicle camera cover device 100 of the present invention that is further comprised of a lid 140 and is attached to the exterior surface 10 of a vehicle (shown as prior art) in accordance with the disclosed architecture. The cover 100 is preferably comprised of a base 110 that includes a magnet layer 120, a magnetic base layer 130 and a transparent lid 140. In all embodiments of the cover 100, the cover is comprised of a base 110 having a magnet layer 120 and a magnetic base layer 130, though it is also contemplated that an adhesive may be used in place of the magnets. Stated differently, the base may have an adhesive layer 120 and an adhesive base layer 130. The magnet layer 120 of the base 110 allows the cover 100 to be retained on the exterior surface 10 of a vehicle via a magnetic force. The magnetic layer 130 may be comprised of any known magnet in the art including but not limited to: Neodymium iron boron magnets, samarium cobalt magnets, alnico magnets, ceramic magnets, ferrite magnets, etc. However, in order to ensure that the bottom surface 122 of the magnetic layer 120 does not scratch, chip or damage the exterior surface 10 of a vehicle, the bottom surface 122 may be comprised of a thin layer of soft padding 1220. As such, the padding 1220 is thick enough such that the bottom surface 122 cannot damage a vehicle exterior 10, but thin enough such that the magnetic field between the magnet layer 120 and vehicle exterior 10 is not diminished.

Figure 1B:
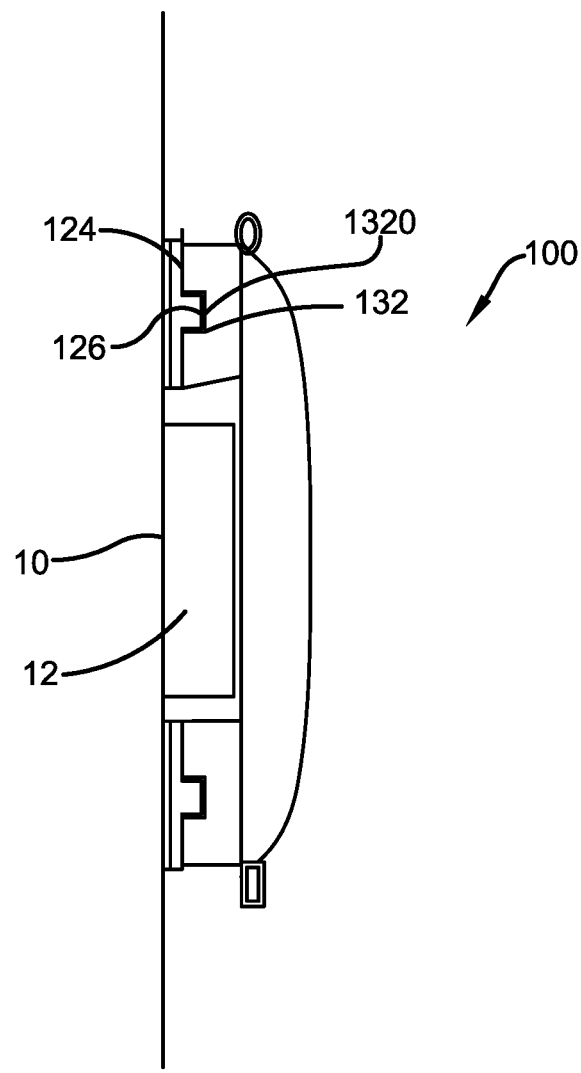
FIG. 1B illustrates a side perspective view of one potential embodiment of a vehicle camera cover device of the present invention that is further comprised of a lid and is attached to the exterior surface of a vehicle (shown as prior art) in accordance with the disclosed architecture.

The magnet layer 120 further attaches to a magnetic base layer 130 via magnetic attraction. In one embodiment of the cover 100, the bottom surface 132 of the magnetic base layer 130 is simply magnetized such that it is in magnetic connection with the top surface 124 of the magnet layer 120. However, in one embodiment of the cover 100 the magnet layer 120 and magnetic base layer may be comprised of a tongue 126 and groove 1320 assembly, as shown in FIG. 1B. To better secure the magnet layer 120 to the base layer 130, the top surface 124 of the magnet layer 120 may be comprised of a tongue 126 that is comprised of the same magnetic material as the magnet layer 120. Further, the bottom surface 132 of the magnetic base layer 130 may be comprised of a groove 1320 that is comprised of the same magnetic material as the bottom surface 132. In this regard, the tongue 126 and groove 1320 connection further strengthens the attachment of the magnetic base layer 130 to the magnet layer 120.

As also seen in FIGS. 1A and 1B. the side surface 134 (or top surface 136) of the base layer 130 may further be comprised of a locking hinge 146 that allows a transparent lid 140 to attach to the base layer 130 and remain in a locked position covering a camera 12. However, in differing embodiments, the hinge 146 may be comprised of a plurality of hinge types, such as but not limited to: an offset blind hinge, a knuckle hinge, a butt hinge, a rising butt hinge, a gravity pivot hinge, a ball bearing hinge, a barrel hinge, a concealed hinge, a knife hinge, a piano hinge, a strap hinge, a pivot hinge, a gas-piston hinge, an injection molded hinge, a locking hinge, etc. The transparent lid 140 is preferably comprised of a transparent plastic material that is impact-resistant, such as but not limited to: acrylic, polycarbonate, polyethylene, thermoplastic, acrylonitrile butadiene styrene, low density polyethylene, medium density polyethylene, high density polyethylene, polyethylene terephthalate, polyvinyl chloride, polystyrene, polylactic acid, acetal, nylon, fiberglass, etc. Further, the lid 140 is preferably comprised of a convex outer surface 142 and a concave inner surface 144, wherein the outer surface 142 is comprised of a fixedly-attached (e.g. molded) pull tab 148 that allows a user to lift the lid 140 about the hinge 146 in order to clean, replace, or remove the lid 140 or to clean the vehicle camera 12 the lid 140 covers. In one embodiment of the cover 100, the outer surface 142 may also be coated with a water-repellant coating such that precipitation cannot collect on the outer surface 142 and obstruct the view of the camera 12.

Figure 2A:
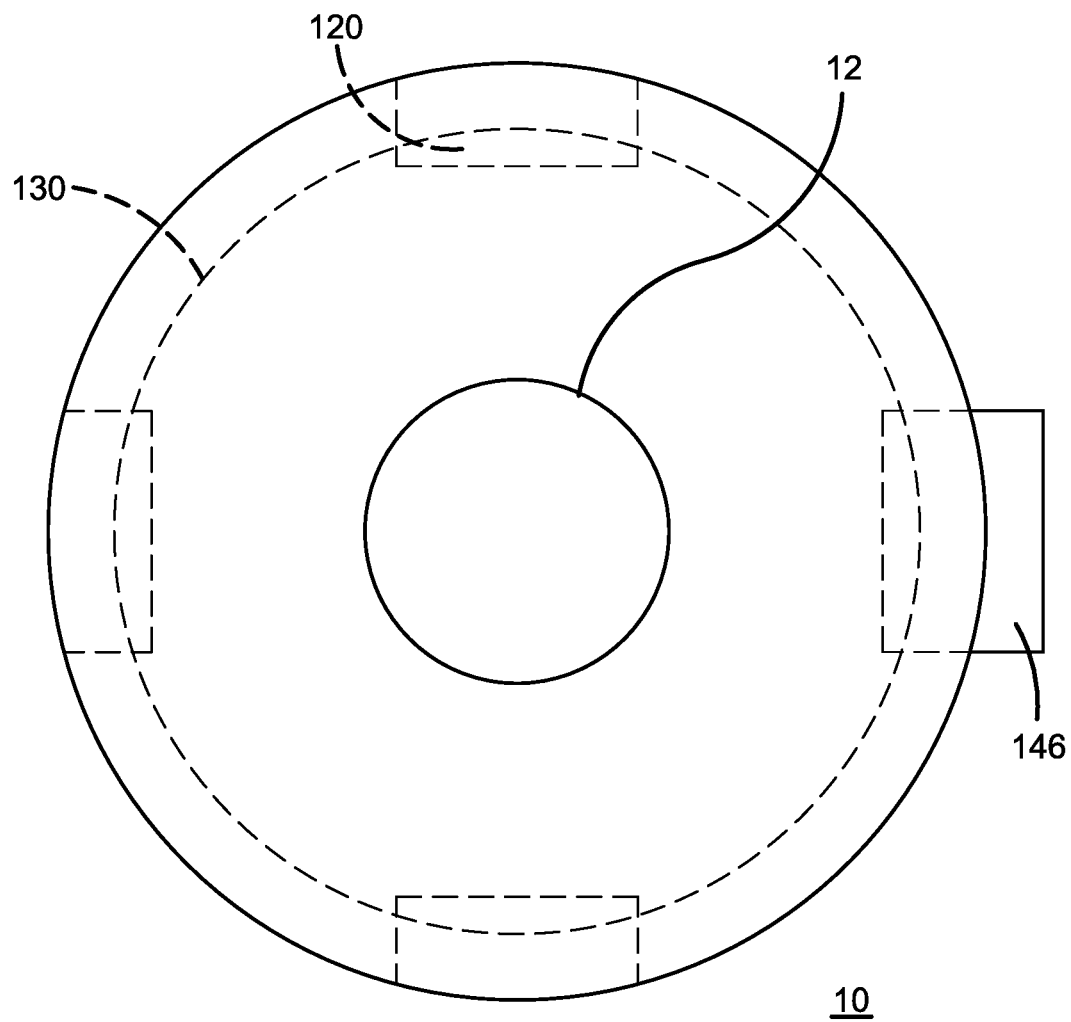
FIG. 2A illustrates a front perspective view of one potential circular embodiment of a vehicle camera cover device of the present invention that is further comprised of a lid and is attached to the exterior surface of a vehicle (shown as prior art) in accordance with the disclosed architecture.
Figure 2B:
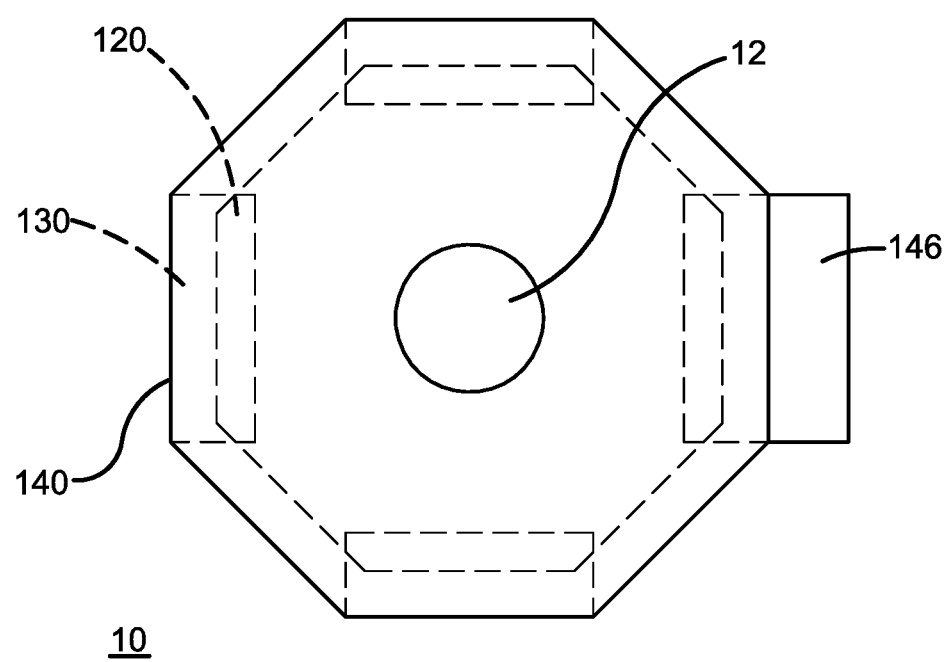
FIG. 2B illustrates a front perspective view of one potential octagonal embodiment of a vehicle camera cover device of the present invention that is further comprised of a lid and is attached to the exterior surface of a vehicle (shown as prior art) in accordance with the disclosed architecture.

FIGS. 2A and 2B illustrates front perspective views of two potential circular and octagonal embodiments of a vehicle camera cover device 100 of the present invention that is further comprised of a lid 140 and is attached to the exterior surface 10 of a vehicle (shown as prior art) in accordance with the disclosed architecture. In differing embodiments, the magnetic base layer 130 may encircle a camera 12 in a plurality of shapes including a circle and an octagon, as shown in FIGS. 2A and 2B. However, it is contemplated that the base layer 130 may be any other shape known in the art such as but not limited to: square, rectangular, oval, triangular, hexagonal, pentagonal, polygonal, etc. Further, the magnet layer 120 may be identical in shape to the base layer 130, or may be rectangular (as shown in FIGS. 2A and 2B), circular, triangular, oval, etc. In addition, the magnet layer 120 may or may not contact every portion of the bottom surface 132 of the magnetic base layer 130. Accordingly, the transparent lid 140 may mirror the shape of the base layer 130 and may be circular, octagonal, or any other shape known in the art, such as but not limited to: square, rectangular, oval, triangular, hexagonal, pentagonal, polygonal, etc.

Figure 3:
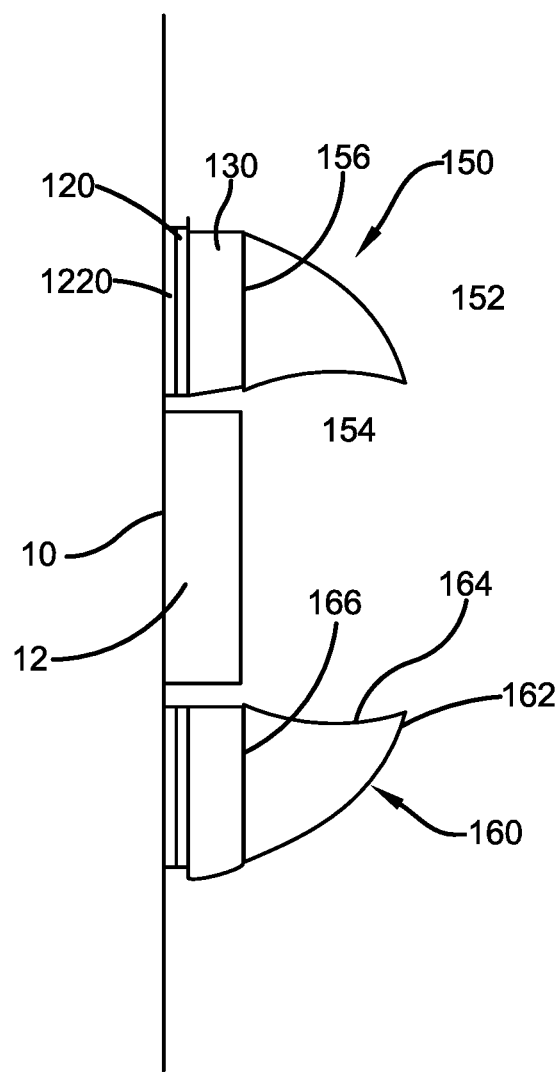
FIG. 3 illustrates a side perspective view of one potential embodiment of a vehicle camera cover device of the present invention that is further comprised of an upper and lower hood and is attached to the exterior surface of a vehicle (shown as prior art) in accordance with the disclosed architecture.
Figure 4:
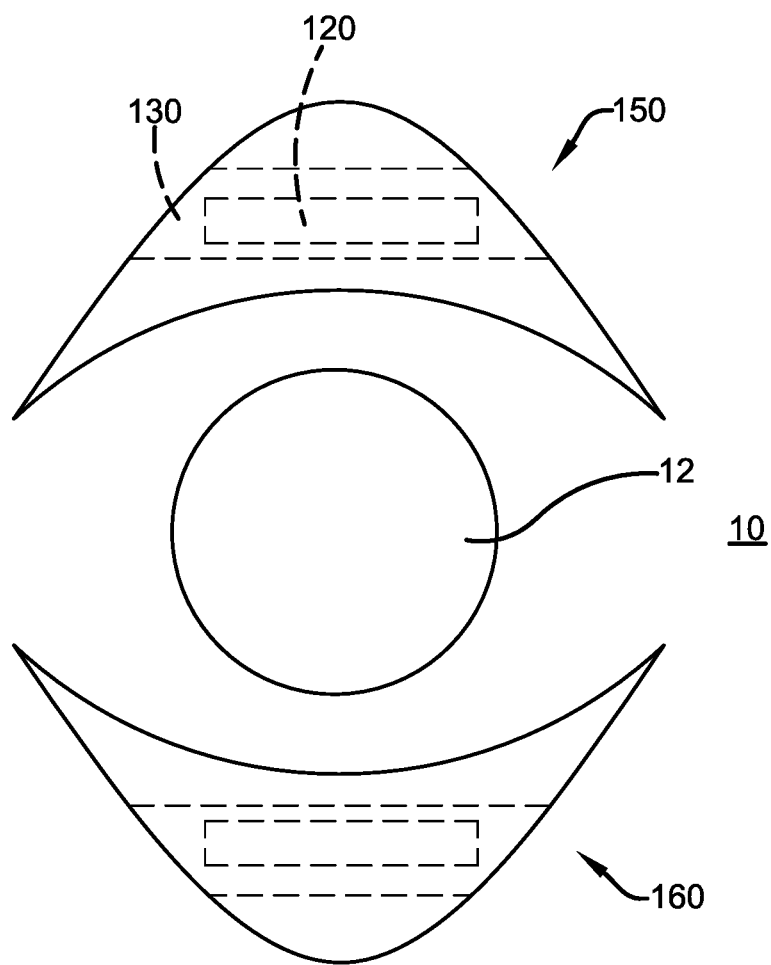
FIG. 4 illustrates a front perspective view of one potential embodiment of a vehicle camera cover device of the present invention that is further comprised of an upper and lower hood and is attached to the exterior surface of a vehicle (shown as prior art) in accordance with the disclosed architecture.

FIG. 3 illustrates a side perspective view of one potential embodiment of a vehicle camera cover device 100 of the present invention that is further comprised of an upper and lower hood 150, 160 and is attached to the exterior surface 10 of a vehicle in accordance with the disclosed architecture. In one embodiment of the cover 100, the cover may not be comprised of a transparent lid 140 and is instead comprised of an upper hood 160 and lower hood 160. As also seen in FIG. 4, the upper hood 150 is generally concave in shape and is comprised of a concave outer surface 152 and a convex inner surface 154, wherein the upper hood 150 is placed above a camera 12 on a vehicle exterior 10. The lower hood 160 is generally convex in shape and is comprised of a convex outer surface 162 and a concave inner surface 164, wherein the lower hood 160 is placed above a camera 12 on a vehicle exterior 10. As with any embodiment of the cover 100, both the upper hood 150 and lower hood 160 are comprised of a magnet layer 120 and magnetic base layer 130, wherein the magnetic base layer 130 is fixedly-attached to the rear surfaces 156,166 of each hood 150, 160. Further, the magnet layer 120 and base layer 130 may be comprised of tongue 126 and groove 1320 architecture, as described supra.

Certain terms are used throughout the following description and claims to refer to particular features or components. As one skilled in the art will appreciate, different persons may refer to the same feature or component by different names. This document does not intend to distinguish between components or features that differ in name but not structure or function. As used herein "vehicle camera cover", "vehicle camera cover device", "device", and "cover", are interchangeable and refer to the vehicle camera cover 100 of the present invention.

Notwithstanding the forgoing, the vehicle camera cover 100 of the present invention and its various components can be of any suitable size and configuration as is known in the art without affecting the overall concept of the invention, provided that they accomplish the above-stated objectives. One of ordinary skill in the art will appreciate that the size, configuration and material of the vehicle camera cover 100 as shown in the FIGS. are for illustrative purposes only, and that many other sizes and shapes of the vehicle camera cover 100 are well within the scope of the present disclosure. Although the dimensions of the vehicle camera cover 100 are important design parameters for user convenience, the vehicle camera cover 100 may be of any size, shape and/or configuration that ensures optimal performance during use and/or that suits the user's needs and/or preferences.

Various modifications and additions can be made to the exemplary embodiments discussed without departing from the scope of the present invention. While the embodiments described above refer to particular features, the scope of this invention also includes embodiments having different combinations of features and embodiments that do not include all of the described features. Accordingly, the scope of the present invention is intended to embrace all such alternatives, modifications, and variations as fall within the scope of the claims, together with all equivalents thereof.

What has been described above includes examples of the claimed subject matter. It is, of course, not possible to describe every conceivable combination of components or methodologies for purposes of describing the claimed subject matter, but one of ordinary skill in the art may recognize that many further combinations and permutations of the claimed subject matter are possible. Accordingly, the claimed subject matter is intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A vehicle camera cover comprising:
   an upper hood base comprising a magnet layer and a magnetic base layer fixedly attached to a rear surface of the upper hood base;
   a lower hood base comprising a magnet layer and a magnetic base layer fixedly attached to a rear surface of the lower hood; and
   wherein the upper and lower base hoods are concave in shape, each further comprising a convex outer surface and a concave inner surface.

2. The vehicle camera cover of claim 1, wherein each magnet layer is attached to an exterior of a vehicle via a magnetic field.

3. The vehicle camera cover of claim 2, wherein each magnetic base layer is magnetically attracted to the respective magnet layer.

4. The vehicle camera cover of claim 3, wherein the vehicle camera cover partially surrounds an exterior camera of the vehicle.

* * * * *